Jan. 23, 1962   E. H. BRAUER, JR   3,017,647
WORK TURNOVER MECHANISM
Filed Aug. 6, 1959   2 Sheets-Sheet 1
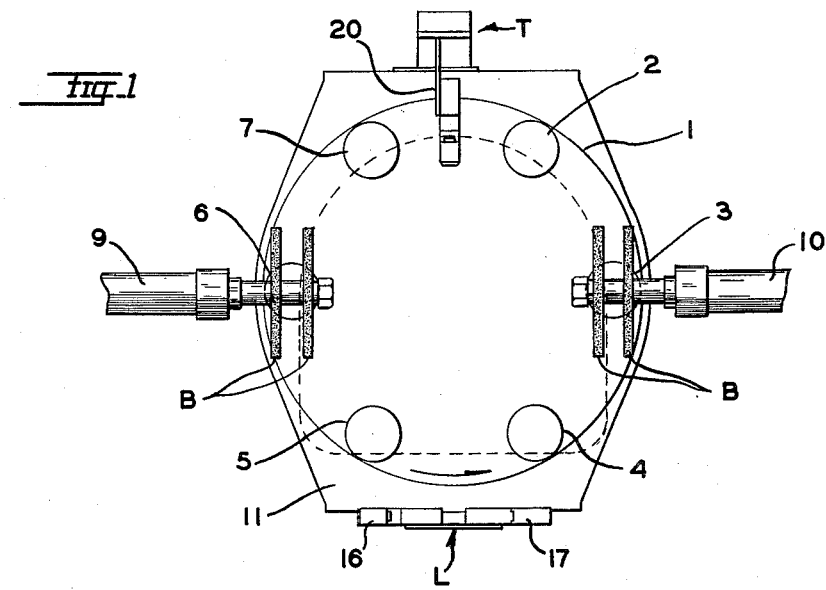
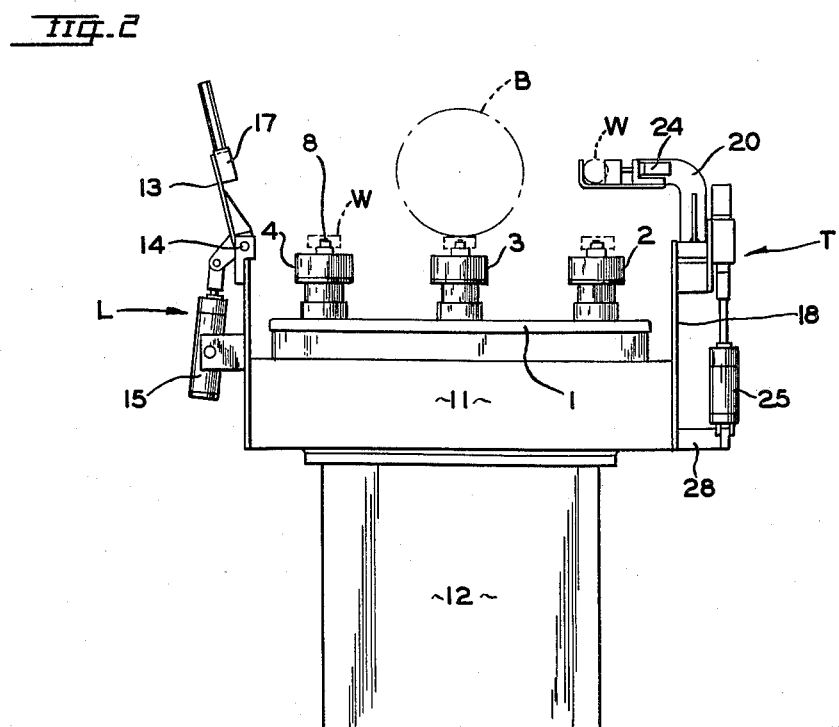
INVENTOR.
EDWIN H. BRAUER, JR.
BY
Oberlin, Maky & Donnelly
ATTORNEYS

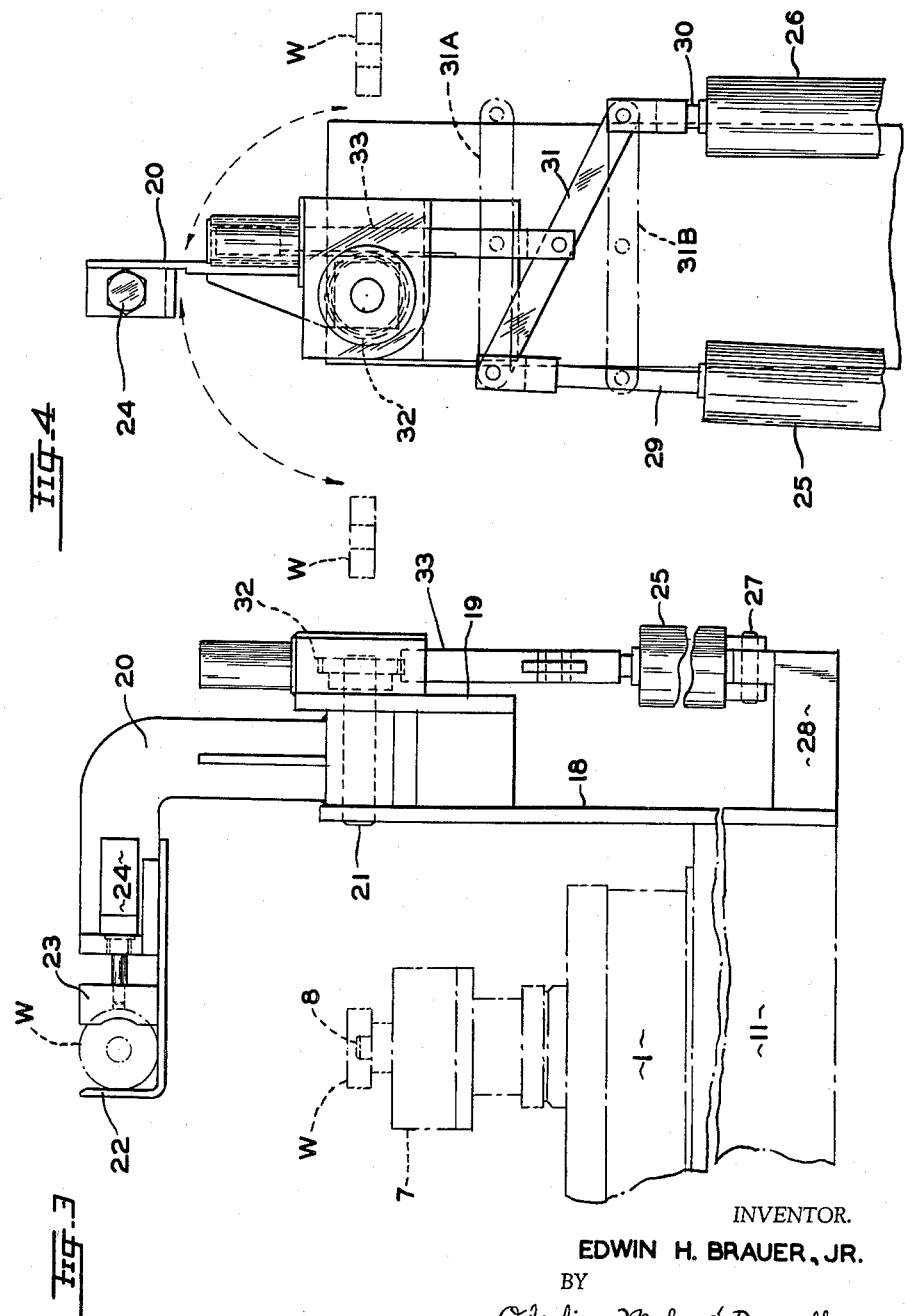

United States Patent Office 3,017,647
Patented Jan. 23, 1962

3,017,647
WORK TURNOVER MECHANISM
Edwin H. Brauer, Jr., Cleveland, Ohio, assignor to The Osborn Manufacturing Company, Cleveland, Ohio, a corporation of Ohio
Filed Aug. 6, 1959, Ser. No. 832,064
8 Claims. (Cl. 15—21)

This invention relates as indicated to a novel work turnover mechanism, and more particularly to a work turnover device adapted to remove a work-piece from a chuck, spindle or the like, turn such work-piece over, and replace it upon the same or similar chuck or spindle.

Power driven rotary brushes are being employed in an increasing degree in the processing of work-pieces such as gears, for example, to remove burrs produced in the gear cutting operation, to blend sharp corners and angles and to provide a superior surface finish. Reference may be had, for example, to Nelson et al. Patent 2,682,065 which discloses a superior form of work-piece holder operative to present such work-pieces to the rotating brushes and also to the applicaiton of Lyndon C. Cole, Serial No. 679,720, filed August 22, 1957, for "Power Brushing Machine," now Patent No. 2,909,015, issued Oct. 20, 1959, disclosing a brushing head of the general type which may, for example, be employed for such purpose. brushing heads or power brushing machines of this general type may be mounted alongside work carrying turntables which, when indexed in known manner, carry successive work-pieces into position for engagement by the power driven rotary brushes.

In view of the foregoing, it is a particular object of my invention to provide work turnover mechanism particularly adapted to remove work-pieces from the chucks, spindles or the like on work-piece conveying means such as a rotary turntable and to turn such work-pieces over and replace them upon a similar or the same chuck or spindle in order that both sides of the work-piece may be subjected to the action of the associated tool such as a power driven rotary brush.

Another object is to provide such mechanism which will be of simple construction and automatic in operation.

A further object is to provide such mechanism which is particularly adapted to handle a series of identical work-pieces such as gears or the like.

Other objects of the invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

FIG. 1 is a semi-diagramamtic top plan view showing a work transporting turntable with two diametrically oppositely disposed power brushing stations;

FIG. 2 is a side elevation of such turntable and the work loading and unloading mechanism and the work turn-over mechanism of this invention assembled therewith;

FIG. 3 is a side elevational view of such work turnover mechanism on an enlarged scale showing details of the construction thereof; and FIG. 4 is an elevation of such work turn-over mechanism taken at right angles to FIG. 3, all such figures showing the work turn-over mechanism in neutral or intermediate position.

Referring now more particularly to such drawing, the work turn-over mechanism of my invention may be mounted for cooperation with a turntable 1 adapted to be indexed from station to station about a vertical axis by means of a Geneva movement drive mechanism or the like (not shown). Such turntable may be provided with a plurality of equally spaced vertically extending work carrying spindles 2, 3, 4, 5, 6 and 7 provided with expanding chucks such as 8 on which a work-piece W may be secured for deburring or the like through the action of power driven rotary brushes B carried by the horizontally extending spindles of brushing lathes 9 and 10 independently mounted at diametrically opposite sides of turntable 1. The work carrying spindles and their chucks 8 may desirably be rotated about their vertical axes in well-known manner to ensure uniform action of the brushes B upon the work-piece.

The work table 1 is carried by a frame 11 in turn supported by a base 12. Such frame 11 projects laterally beyond the edge of turntable 1 in regions diametrically opposed to one another and 90° removed from the two brushing stations above defined. On one such projecting portion of underframe 11 is mounted a work loading mechanism L and diametrically opposite thereto is mounted the work turn-over mechanism T of this invention.

The work loading mechanism L is described and claimed in my co-pending application Serial No. 832,063, filed Aug. 6, 1959, entitled "Work Load and Unload Device." Briefly, it may comprise a swinging arm 13 adapted to be rocked about horizontal pivot 14 by means of piston-cylinder assembly 15. Such arm 13 carries two oppositely horizontally extending clamping portions 16 and 17 adapted to be rocked down into horizontal position so that the clamp 16 may engage and grip a finished work-piece on the spindle 5 (FIG. 1) while clamp 17 simultaneously deposits an untreated work-piece on the chuck of spindle 4. As the arm 13 is again rocked upward slightly past vertical position, the finished work-piece is carried by clamp 16 into proper discharge position while clamp 17 receives another untreated work-piece ready to be placed on the chuck of spindle 5 when such empty spindle is now indexed to the spindle 4 position as shown in FIG. 1. It will be seen from an inspection of FIG. 1 that the work carrying spindles are so arranged and spaced that while the rotary brushes or other appropriate tools are operating upon the upper faces of the work-pieces supported by the spindles directly therebeneath, the other four spindles are positioned in pairs with one spindle at each side of the loading station (spindles 4 and 5) and one spindle at each side of the turn-over station (spindles 2 and 7).

Referring now more particularly to FIGS. 3 and 4 of the drawing, the embodiment of the work turn-over mechanism of my invention there illustrated will now be described in detail. A vertically extending stand 18 is welded to the side of frame 11 and is provided with a bracket 19 at its upper end in which is mounted an L-shaped arm 20 for oscillation about a horizontal pivot 21 extending radially of the turntable. The upper end of arm 20 extends radially above turntable 1 and the length of the arm is such that when it is rocked from one horizontal position to the other, its outer end portion will directly overlie spindles 2 and 7 as shown in FIG. 1. The work-piece W is adapted to be held by a clamp comprising the upturned outer end portion 22 of the arm and the opposed horizontally reciprocable clamping jaw 23 adapted to be reciprocated through the action of air cylinder 24. Thus, arm 20 is adapted to be rocked 180° from one horizontal position to the other so that it may clamp and lift off a work-piece at the spindle 2 position (FIG. 1) and deposit it upon a spindle at the spindle 7 position. The work-piece may, however, be temporarily held at an intermediate or neutral position as shown in FIG. 3 until the work table has been indexed to carry the spindle from which the work-piece has just been removed (at the spindle 2 position) to the spindle 7 position where the work-piece may now be redeposited upon the same spindle, but, of course, in inverted position. The brushes of brushing lathes 9 and 10 will accordingly be operative to engage and brush opposite sides of such work-pieces.

A preferred form of operating mechanism for such rocking turn-over arm comprises a pair of generally vertically extending pneumatic cylinders 25 and 26 pivotally mounted at their lower ends such as 27 to bracket 28 on underframe 11. Rods 29 and 30 of cylinders 25 and 26 respectively are pivotally interconnected by a link 31 which will be in the position shown in solid line when arm 20 is in the intermediate vertical position shown in FIGS. 3 and 4 but will be in position 31A when arm 20 has been rocked into horizontal position to the left as viewed in FIG. 4 and in position 31B when such arm has been rocked into horizontal position as indicated at the right in FIG. 4. A pinion 32 is keyed to pivot pin 21 to which such arm 20 is likewise keyed, and such pinion is engaged by a vertically reciprocable rack 33 pivotally connected at its lower end to the mid point of transverse link 31. Accordingly, when both rods 29 and 30 are fully retracted, rack 33 will be in lowermost position and arm 20 will be rocked into one horizontal position. When one rod is extended while the other rod remains retracted, arm 20 will be swung up into vertical position as shown in FIGS. 3 and 4. And when both rods 29 and 30 are fully extended, arm 20 will now have been rocked 180° into the other horizontal position.

Inasmuch as the work-pieces are ordinarily engaged by the abrading tools only at stations 9 and 10, it is only necessary that the work carrying spindles be rotated about their vertical axes while at these stations, the spindles preferably being non-rotating at the loading and unloading station and at the work turn-over station.

Following a single work-piece through a complete cycle of operation, it will be seen that such work-piece after being deposited in loading clamp 17 of arm 13 will be swung down and deposited on the spindle in the spindle 4 position as seen in FIG. 1. When the table is next indexed, such work-piece will be carried beneath the brushes B of the brushing lathe 10 and may be rotated about its vertical axis to ensure uniform brushing of its upper surface and exposed corners, etc. The work-piece is thereupon indexed to the spindle 2 position where the clamp on the end of arm 20 may be swung down to engage and pick up the same, temporarily lifting the work-piece from the spindle and carrying it to the elevated intermediate position of FIGS. 3 and 4. The turntable is again indexed carrying the vacated spindle from the spindle 2 position to the spindle 7 position whereupon the turnover device is further actuated to swing arm 20 through the remaining 90° of its arc again to deposit the work-piece upon the same spindle but now in inverted position. Alternatively, the work-piece may be swung directly from the spindle 2 to the spindle 7 position prior to indexing. The turntable is again indexed to carry the work-piece beneath the brushes of brushing lathe 9 and the spindle may be rotated about its vertical axis while the brushes operate upon the newly exposed surface of the work-piece. The next index movement of the turntable carries the spindle to the spindle 5 position where the completely brushed work-piece is engaged by clamp 16 of the loading and unloading mechanism L and lifted from the spindle to be carried slightly past vertical into the position indicated in FIG. 2 where it may be released and discharged down an appropriate delivery chute.

It will be seen that I have provided a work-piece turnover mechanism particularly adapted for employment in conjunction with automatic or semi-automatic work-piece conveying and abrading mechanisms to ensure that both sides of the work-piece are similarly uniformly operated upon. It will be appreciated that instead of power driven rotary brushes, various other appropriate tools such as grinding wheels, buffs, drills, milling cutters and the like may be employed at the respective work stations. Likewise, the operations performed upon the respective sides of the work-piece need not necessarily be identical.

Other modes of applying the principle of the invention may be employed, change being made as regards the details described, provided the features stated in any of the following claims or the equivalent of such be employed.

I therefore particularly point out and distinctly claim as my invention:

1. In work processing mechanism including a turntable adapted to be rotated to index work thereon from station to station, means operative to load unprocessed work-pieces on said turntable and to unload processed work-pieces therefrom, and at least two work processing stations; a work turnover station intermediate said work processing stations comprising an arm mounted adjacent said turntable for rocking movement about an axis radial of said turntable, a clamp carried by said arm overlying said turntable and adapted to grip a work-piece on said turntable when said arm is in one horizontal position and to release such work-piece on said turntable when said arm has been rocked 180° to its other horizontal position, and power means operative thus to rock said arm.

2. The mechanism of claim 1, wherein said power means is a fluid pressure piston-cylinder assembly.

3. The mechanism of claim 1, wherein said power means is a fluid pressure piston-cylinder assembly comprising two vertical parallel cylinders having rods projecting upwardly therefrom, a link pivotally interconnecting said rods, a vertical rack pivotally connected to said link at the mid-point of the latter, and a pinion meshing with said rack and keyed to a pivot pin on which said arm is mounted.

4. The mechanism of claim 1, wherein said turntable is provided with a plurality of upstanding work carrying spindles spaced apart a distance equal to the distance between the two horizontal positions of said clamp whereby a work-piece may be lifted from one said spindle and deposited on an adjacent spindle through such operation of said arm and clamp.

5. The mechanism of claim 1, wherein said arm is of L-shape overhanging said turntable at all times and said clamp carried thereby moves in an arc over said turntable describing a chord projected thereon.

6. In work processing mechanism including work conveying means, a work turnover station comprising an arm mounted adjacent said conveying means for rocking movement about an axis generally normal to the direction of travel of the adjacent portion of said conveying means, a portion of said arm overhanging said conveying means, means on said overhanging portion of said arm operative to hold and release a work-piece, and means operative to rock said arm to swing said work holding means from one position closely above said conveying means to another position closely above said conveying means.

7. The mechanism of claim 6, wherein said conveying means is provided with a plurality of work holding means spaced apart a distance equal to the distance between said two positions of said work holding means on said arm.

8. In work processing mechanism including work conveying means having uniformly spaced work holding means mounted thereon, work turnover means adapted to pick up a work-piece from one said work holding means, invert the same, and deposit such inverted work-piece on a said work holding means at another position comprising a member mounted for swinging movement adjacent said conveying means, work holding means on said member, and power means operative to oscillate said member back and forth through an arc of 180° to move said work holding means thereon from a position to engage a work-piece on a said work holding means on said conveying means to a work holding means on said conveying means at such other position.

References Cited in the file of this patent

UNITED STATES PATENTS

| | | |
|---|---|---|
| 407,161 | Brooks | July 16, 1889 |
| 2,240,093 | Farris | Apr. 29, 1941 |
| 2,293,192 | Campbell | Aug. 18, 1942 |
| 2,844,917 | Caldwell | July 29, 1958 |